United States Patent [19]
Armesto et al.

[11] Patent Number: 5,960,839
[45] Date of Patent: Oct. 5, 1999

[54] FUEL TANK SYSTEM

[75] Inventors: Carlos Armesto, Plymouth; James Allan Fairbairn, Livonia, both of Mich.

[73] Assignee: Ford Global Technologies, Inc., Dearborn, Mich.

[21] Appl. No.: 09/129,493

[22] Filed: Aug. 5, 1998

[51] Int. Cl.⁶ ................................................. B65B 1/04
[52] U.S. Cl. .................... 141/304; 141/301; 141/350; 220/86.2
[58] Field of Search .................... 141/301, 302, 141/304, 307, 350; 220/86.2

[56] References Cited

U.S. PATENT DOCUMENTS

| | | | |
|---|---|---|---|
| 4,091,959 | 5/1978 | O'Banion | 220/304 |
| 4,651,889 | 3/1987 | Uranishi et al. | |
| 4,809,863 | 3/1989 | Woodcock et al. | |
| 4,941,587 | 7/1990 | Terada | 220/58 S |
| 5,056,570 | 10/1991 | Harris et al. | |
| 5,103,877 | 4/1992 | Sherwood et al. | 141/302 |
| 5,271,438 | 12/1993 | Griffin et al. | |
| 5,431,199 | 7/1995 | Benjay et al. | 141/59 |
| 5,462,100 | 10/1995 | Covert et al. | |
| 5,595,222 | 1/1997 | Thompson | |
| 5,638,874 | 6/1997 | Thompson | |
| 5,660,206 | 8/1997 | Neal et al. | |

Primary Examiner—Henry J. Recla
Assistant Examiner—Khoa Huynh
Attorney, Agent, or Firm—Donald A. Wilkinson

[57] ABSTRACT

A fuel tank sealing system for a fuel tank filler tube is disclosed in which the fuel system is sealed when the fuel cap is not installed, or improperly installed and allows pressure equalization during the insertion of a refueling nozzle. A vent valve is first actuated by partial insertion of the nozzle and allows pressure equalizing flow to bypass the refueling nozzle. A flap valve is then actuated by complete insertion of the refueling nozzle to allow fuel to enter the fuel tank.

9 Claims, 2 Drawing Sheets

FUEL TANK SYSTEM

FIELD OF THE INVENTION

The present invention relates to a fuel tank sealing system for an automobile having a fuel filler pipe in which a positive seal retainer is employed.

BACKGROUND OF THE INVENTION

Conventional vehicle fuel tank systems have a removable fuel tank cap for sealing the unburned hydrocarbon fuel in the fuel tank system. In general, the fuel tank cap contains pressure relief and vacuum relief valves for relieving excessive pressure or vacuum. However, if the cap is improperly installed or is not installed at all, fuel vapors may escape into the atmosphere due to even slight pressure buildup in the fuel tank. Recent regulation related to the emission of unburned hydrocarbon fuel has required a solution to this problem.

One approach to preventing fuel vapor discharge out of the fuel tank is to use an onboard diagnostic leak detection system. In such a system, a vacuum is applied to the fuel tank and the corresponding fuel tank pressure is measured. If a leak is present, a corresponding pressure response is observed. When no leak is preset, a different pressure response is observed. Thus, it is possible to diagnose a possible fuel tank leak, or an improperly installed fuel tank cap.

Another approach, which may combined with the previous approach, is to use a flap valve, spring biased in the closed position, in the fuel tank filler tube. This allows the fuel tank filler tube to be sealed if the gas tank cap is not properly installed. This system uses hardware to guarantee a physical seal regardless of the installation of the cap. In addition, a valve element is provided that provides pressure equalization across the flap valve when the cap is properly installed. This is necessary because when refueling, a small amount of residual fuel retained in the refueling nozzle will enter the fuel tank filler tube before the flap valve opened. Thus, without the valve element, fuel may spray back on the nozzle operator due to pressure buildup in the fuel tank system. Such a system is disclosed in U.S. Pat. No. 5,595,222.

The inventor herein has recognized a disadvantage with the above approach. For example, the system still relies on the fuel tank cap to allow pressure equalization. Thus, if the fuel tank cap is improperly installed, while no vapors in the fuel system will be emitted, residual fuel in the refueling nozzle may be sprayed on the nozzle operator due to unreleased pressure in the fuel tank system. Another example is that the system still relies on the fuel tank cap to provide a seal when properly installed. In other words, a cap may be properly installed; however, if defective, it may create a poor seal, which can lead to a leak.

SUMMARY OF THE INVENTION

An object of the invention claimed herein is to provide a fuel tank system for an automobile that prevents emission of fuel vapor.

The above object is achieved, and disadvantages of prior approaches overcome, by providing a novel fuel tank sealing system for a fuel tank filler tube. In one particular aspect of the invention, the system includes an upper portion of the fuel tank filler tube communicating with atmosphere, a lower portion of the fuel tank filler tube communicating with a fuel tank, and a biased closed vent valve located in the fuel tank filler tube between the upper portion and the lower portion. The vent valve is adapted to be actuated by a refueling nozzle so as to also allow vapor flow between said upper portion and said lower portion of the fuel tank filler tube. The system also includes a biased closed flap valve located in the fuel tank filler tube between the upper portion and the lower portion. The flap valve is adapted to be actuated by the refueling nozzle so as to allow fuel flow between the upper portion and the lower portion of the fuel tank filler tube only after the vent valve is actuated by the refueling nozzle, thereby achieving pressure equalization before the refueling nozzle actuates the flap valve.

By actuating the vent valve before the flap valve, it is possible to equalize the fuel tank pressure with the atmosphere whereby the pressure equalizing flow passes through the vent valve and bypasses the refueling nozzle. Then, when the flap valve is actuated, any residual fuel left in the refueling nozzle from previous operation that falls onto the flap valve may not experience pressure equalization flow. Thus, the residual fuel may not be forced out of the fuel filler tube into the atmosphere.

An advantage of the above aspect of the invention is reduced emissions.

Another advantage of the above aspect of the invention is a reduction in malfunction indicator warnings.

Other objects, features and advantages of the present invention will be readily appreciated by the reader of this specification.

BRIEF DESCRIPTION OF THE DRAWINGS

The object and advantages described herein will be more fully understood by reading an example of an embodiment in which the invention is used to advantage, referred to herein as the Description of the Preferred Embodiment, with reference to the drawings wherein.

BRIEF DESCRIPTION OF THE PREFERRED EMBODIMENT

Figure 1:
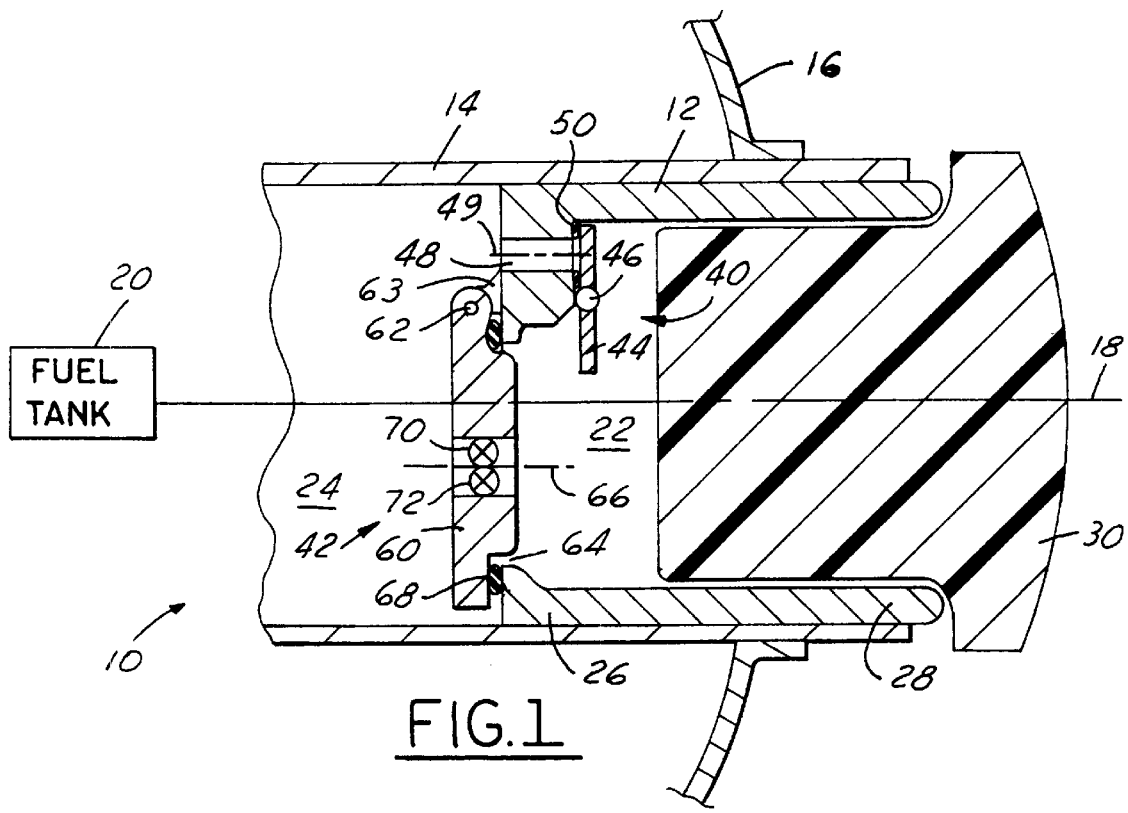
FIG. 1 is a cross-sectional view showing a fuel tank sealing system with a fuel cap installed.

Referring to FIG. 1, according to the present invention, system 10 includes cylindrically shaped retainer 12 coaxially located within filler tube 14, which, in turn, is attached to vehicle 16. Filler tube 14 is generally cylindrically shaped and has longitudinal axis 18 and communicates with fuel tank 20 as indicated in FIG. 1. Filler tube 14 includes upper portion 22 communicating with atmosphere and lower portion 24 communicating with tank 20. In addition, any arrangement of carbon canisters known to those skilled in the art may be used with the present invention as needed. Retainer 12 includes proximal end 26, located generally adjacent tank 20, and distal end 28 adapted to receive fuel fill cap 30.

System 10 further includes vent valve 40 and flap valve 42. Vent valve 40 includes vent lever 44 pivotally attached at pivot 46 to proximal end 26 of retainer 12. Vent passage 48, having axis 49 (which is offset from axis 18), is disposed in distal end 26 of retainer 12 and communicates between upper portion 22 and lower portion 24 to allow fuel vapor to flow therethrough. Vent valve 40 further includes vent seal 50 located between vent lever 44 and 16 and retainer 12. Vent lever 44 is biased to close vent passage 48 through, for example, the use of a torsion spring. Alternatively, vent lever 44 may be integrally molded into a plastic retainer and hinged in a manner to allow selective opening of passage 48. Thus, as used herein, "pivotally attached" includes any means which will allow selective opening of passage 48.

Flap valve 42 includes flap lever 60 pivotally attached at pivot 62 to bracket 63, which is attached to proximal end 26 of retainer 12. Fuel fill passage 64, having axis 66 (which is also offset from axis 18), is disposed in distal end 26 of retainer 12 and communicates between upper portion 22 and lower portion 24 to allow fuel to flow therethrough. Flap valve 42 further includes flap seal 68 located between flap lever 60 and 16 and retainer 12. Flap lever 60 is biased to close fuel fill passage 64 through, for example, the use of a torsion spring. Alternatively, flap lever 60 may be integrally molded into a plastic retainer and hinged in a manner to allow selective opening of fuel fill passage 64. Thus, as used herein, "pivotally attached" includes any means which will allow selective opening of fuel fill passage 64.

In a preferred embodiment, vent lever pivot 46 is located between distal end 28 of retainer 12 and flap valve 42. Further, vent lever pivot 46 is located within upper volume 22 and flap lever pivot 62 is located within lower volume 24.

Continuing with FIG. 1, in a preferred embodiment, fuel cap 30 does not contain any pressure relief or vacuum relief valves. Rather, pressure relief and vacuum relief valves 70 and 72, respectively, which relieve exceptionally large fuel tank pressures and vacuums, may be incorporated in flap valve lever 60. Both the pressure relief and vacuum relief valves 70, 72 have a calibratable level at which they will open. Alternatively, the pressure relief and vacuum relief valves 70, 72 could be incorporated in vent valve lever 44. Similarly, the pressure relief valve 70 could be incorporated into vent valve lever 44 and the vacuum relief valve 72 could be incorporated into flap valve lever 44 or vice versa. In another embodiment, the function of the pressure relief valve 70 could be accomplished by vent valve 40 and the function of the vacuum relief valve 72 could be accomplished by flap valve 42. This is possible if the biasing method of flap valve 42 can be acceptably set to relieve a desired vacuum level and if the biasing method vent valve 40 can be acceptably set to relieve a desired pressure level, while still maintaining their functionality. In other words, vent valve 40 and flap valve 42 would each have a dual function.

Figure 2:
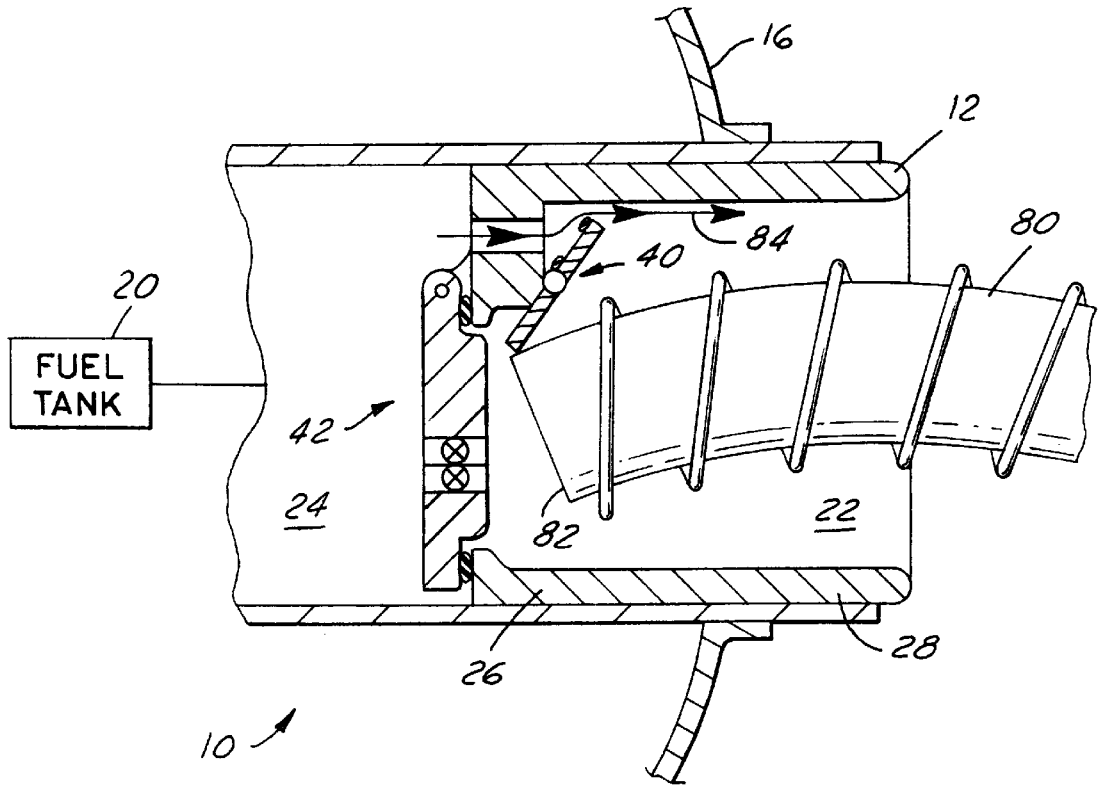
FIG. 2 is a cross-sectional view showing the fuel tank sealing system with a fuel filler nozzle partially inserted.
Figure 3:
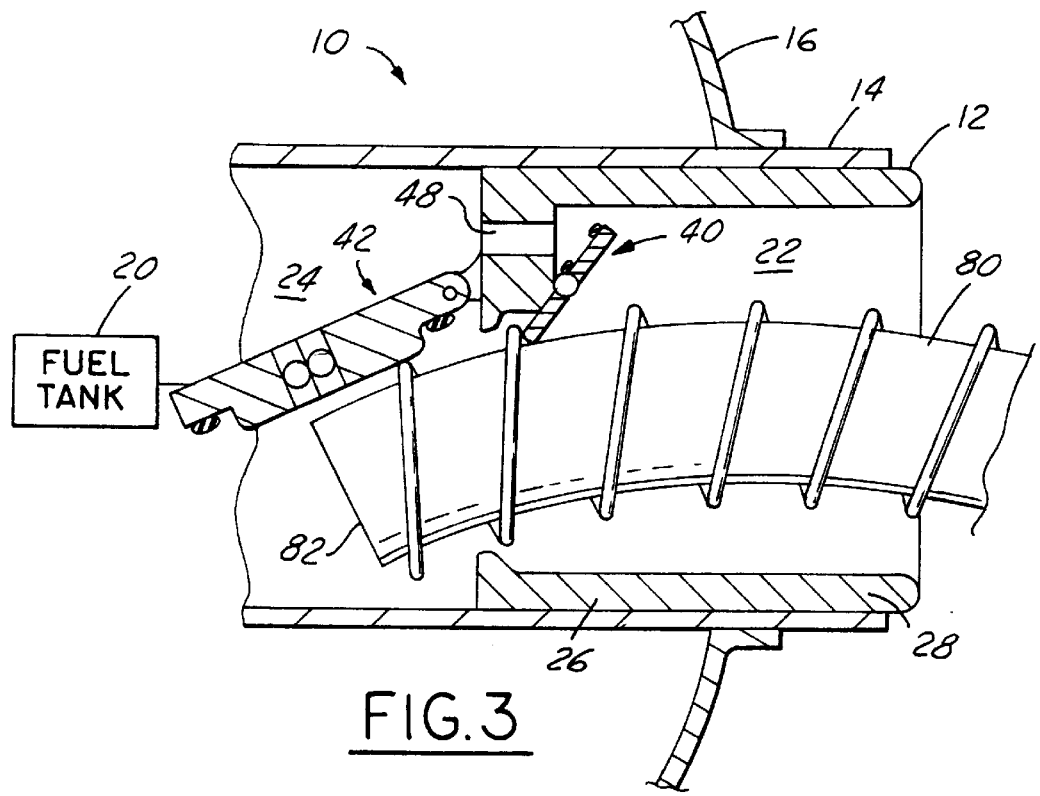
FIG. 3 is a cross-sectional view showing the fuel tank sealing system with a fuel filler nozzle fully inserted.

Turning now to FIGS. 2 and 3, operation of the present invention will now be described. Referring first to FIG. 2, fuel fill cap 30 is first removed and refueling nozzle 30 is inserted through retainer 12 to refuel the vehicle. As a refueling nozzle 80 is inserted, the refueling nozzle 80 first contacts vent valve lever 44 to open vent passage 48 such that pressurized fuel vapor in lower portion 20 can pass through passage 48 to upper portion 22. Further, because axis 49 is offset from axis 18, the pressurized fuel vapor flows around the refueling nozzle 80 avoiding the opening 82 of the refueling nozzle. When lower portion 20 is pressurized, fuel vapors flow along path 84, allowing pressure equalization. In particular, any residual gas in refueling nozzle 80 that falls from refueling nozzle opening 82 onto flap valve 42 before refueling nozzle 80 is actuated does not contact fuel vapors flowing along path 84. Also, fuel vapors flowing along path 84 bypass refueling nozzle opening 82. Thus, there is a reduction in the possibility of residual fuel encountering pressure equalizing flow and exiting into the atmosphere. Further, this system is independent of the state of fuel cap 30. For example, even if fuel cap 30 is left off, or improperly installed, pressure equalization will still be achieved during refueling without possibility of spilling residual fuel. In addition, if fuel cap 30 is left off or improperly installed, this system will prevent constant vapor loss through the biased closed vent valve 40 and flap valve 42.

Referring now to FIG. 3, refueling nozzle 80 is shown fully inserted into fuel filler pipe 14, whereby flap valve lever 60 pivots about pivot 62 to allow nozzle 80 to enter lower portion 24 thus allowing fuel delivery from refueling nozzle 80 to enter fuel tank 20. When refueling nozzle 80 is removed, both vent valve 40 and flap valve 42 return to the closed position as shown in FIG. 1, thus sealing the fuel system. Then, fuel cap 30 can be installed. However, the system does not rely on any seal created by fuel cap 30.

Figure 4:
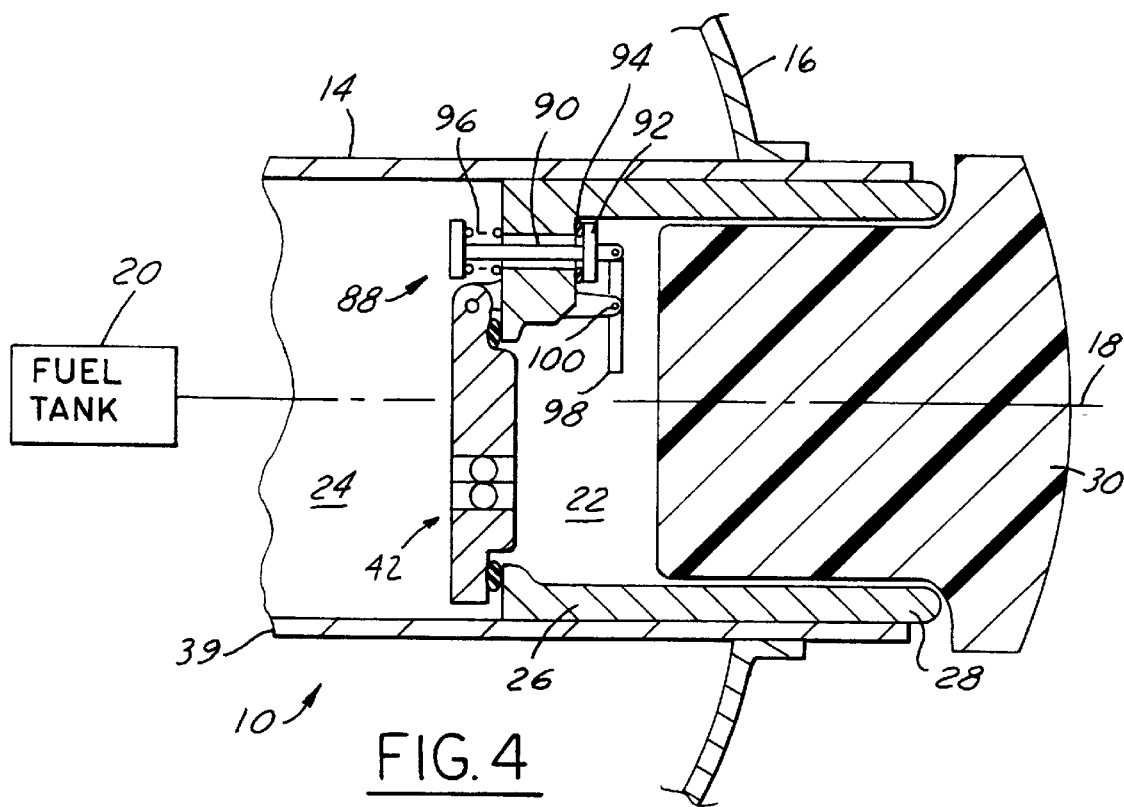
FIG. 4 is a cross-sectional view showing an alternative embodiment of a fuel tank sealing system with a fuel cap installed.

Referring now to FIG. 4, an alternative embodiment of system 10 is shown having vent valve 88. In particular, retainer 12 comprises vent path 90 with spool valve 92 located therein. Vent seal 94 is located between spool valve 92 and retainer 12. Vent path 90 communicates with lower volume 20 of filler pipe 14. Vent path 90 also may communicate with upper volume 22 of filler pipe 14 depending on the position of spool valve 90. Spool valve 90 is biased closed by spring 96 or any other biasing methods known to those skilled in the art and suggested by this disclosure. Spool valve 92 is hinged to lever 98, which, in turn is pivotally attached to retainer 12 at pivot 100. As discussed with reference to FIGS. 1–3, upon insertion of nozzle 80 (not shown in FIG. 4), lever 98 rotates to pull on spool valve 90, overcoming the force of spring 96, to allow vapor flow from lower portion 24 to upper portion 22 through vent path 90.

While the best mode for carrying out the invention has been described in detail, those skilled in the art in which this invention relates will recognize various alternative designs and embodiments, including those mentioned above, in practicing the invention that has been defined by the following claims.

We claim:

1. A fuel tank sealing system for a fuel tank filler tube comprising:

a fuel tank filler tube having a generally uniform cylindrical cross-section; an upper portion of the fuel tank filler tube adapted to be connected to a fuel cap and adapted to communicate with atmosphere when the cap is removed;

a lower portion of the fuel tank filler tube communicating with a fuel tank;

a biased closed vent valve located in the fuel tank filler tube between said upper portion and said lower portion, said vent valve adapted to be actuated by a refueling nozzle so as to also allow vapor flow between said upper portion and said lower portion of the fuel tank filler tube; and a biased closed flap valve located in the fuel tank filler tube between said upper portion and said lower portion, said flap valve adapted to be actuated by the refueling nozzle so as to allow fuel flow between said upper portion and said lower portion of the fuel tank filler tube only after said vent valve is actuated by the refueling nozzle, thereby achieving pressure equalization before said refueling nozzle actuates said flap valve.

2. The system recited in claim 1 wherein said flap valve comprises a pressure relief valve disposed therein for relieving a fuel tank pressure when said fuel tank pressure reaches a predetermined level.

3. The system recited in claim 1 wherein said flap valve comprises a vacuum relief valve disposed therein for relieving a fuel tank vacuum when said fuel tank vacuum reaches a predetermined level.

4. The system recited in claim 1 wherein said vapor flow between said upper portion and said lower portion of the fuel tank filler tube bypasses an exit hole of the refueling nozzle, thereby allowing pressure equalization flow to avoid said exit hole.

5. A fuel tank sealing system for a fuel tank filler tube comprising:

a fuel tank filler tube having a generally uniform cylindrical cross-section;

an upper portion of the fuel tank filler tube adapted to be connected to a fuel cap and adapted to communicate with an ambient atmosphere when the cap is removed;

lower portion of the fuel tank filler tube communicating with a fuel tank;

a biased closed vent valve located in the fuel tank filler tube between said upper portion and said lower portion, said vent valve adapted to be actuated by a refueling nozzle so as to also allow fuel vapor flow between said upper portion and said lower portion of the fuel tank filler tube, with said fuel vapor bypassing an exit hole of said refueling nozzle, thereby allowing pressure equalization flow to avoid said exit hole; and a biased closed flap valve located in the fuel tank filler tube between said upper portion and said lower portion, said flap valve adapted to be actuated by said refueling nozzle so as to allow fuel flow between said upper portion and said lower portion of the fuel tank filler tube only after said vent valve is actuated by said refueling nozzle, thereby achieving pressure equalization before said refueling nozzle actuates said flap valve.

6. The system recited in claim 5 wherein said flap valve comprises a pressure relief valve disposed therein for relieving a fuel tank pressure when said fuel tank pressure reaches a predetermined level.

7. The system recited in claim 5 wherein said flap valve comprises a vacuum relief valve disposed therein for relieving a fuel tank vacuum when said fuel tank vacuum reaches a predetermined level.

8. A fuel tank filler tube assembly disposed between a fuel tank and a fuel fill cap, said assembly comprising:

filler tube having a generally uniform cylindrical cross-section along;

a longitudinal axis;

an upper portion communicating with atmosphere when the cap is removed; and, a lower portion communicating with the fuel tank; a generally cylindrically shaped retainer coaxially located within said filler tube, said retainer having a proximal end adjacent to the tank and a distal end adjacent to the fuel fill cap, with said distal end being adapted to be connected to the fuel fill cap;

a vent valve having:

a vent valve lever pivotally attached to said retainer at said proximal end between said upper portion and said lower portion;

a vent passage communicating between said upper portion and said lower portion, with said vent valve lever biased to close said vent passage, with said vent passage being offset from said filler tube axis; and, said vent valve lever being adapted to be actuated by a refueling nozzle so as to allow communication through said vent passage between said upper portion and said lower portion of said filler tube such that fuel vapor from the tank bypasses an exit hole of the refueling nozzle when the nozzle actuates said vent valve lever thereby allowing pressure equalization vapor flowing through said passage to avoid the exit hole; and, a flap valve having:

a flap valve lever pivotally attached to said retainer at said proximal end between said upper portion and said lower portion;

a fuel fill passage communicating between said upper portion and said lower portion, with said flap valve lever biased to close said fuel fill passage, with said fuel fill passage being offset from said filler tube axis; and, said flap valve being adapted to be actuated by the refueling nozzle, so as to allow fuel flow through said fuel fill passage, only after said vent valve lever is actuated by said refueling nozzle, thereby achieving pressure equalization before said refueling nozzle actuates said flap valve lever.

9. The assembly recited in claim 8 wherein said flap valve further comprises a vacuum relief valve disposed within said flap valve lever adapted to relieve a fuel tank vacuum when the fuel tank vacuum reaches a predetermined level and a pressure relief valve disposed within said flap valve lever adapted to relieve a fuel tank pressure when the fuel tank pressure reaches a second predetermined level.

* * * * *